United States Patent
Belapurkar et al.

(10) Patent No.: US 11,252,233 B1
(45) Date of Patent: Feb. 15, 2022

(54) ACHIEVING STRONG CONSISTENCY IN AN EVENTUALLY CONSISTENT DISTRIBUTED SYSTEM

(71) Applicant: INTUIT INC., Mountain View, CA (US)

(72) Inventors: Gayarthri Belapurkar, Bangalore (IN); Karthik Krishna, Bangalore (IN); Narsimha Raju Chigullapally, Bangalore (IN); A. Premasis Patra, Bangalore (IN); Sivaraman Sathyamurthy, Bangalore (IN); Kiran Kumar Shivanandan, Bangalore (IN); Anshu Verma, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/033,559

(22) Filed: Sep. 25, 2020

(51) Int. Cl.
H04L 29/08 (2006.01)

(52) U.S. Cl.
CPC ...... H04L 67/1097 (2013.01); H04L 67/2842 (2013.01); H04L 67/306 (2013.01); H04L 67/34 (2013.01)

(58) Field of Classification Search
CPC .... G06F 16/2365; G06F 16/27; G06F 16/178; G06F 16/93; H04L 67/1097; H04L 67/2842; H04L 67/306; H04L 67/34
See application file for complete search history.

(56) References Cited

U.S. PATENT DOCUMENTS

| | | | |
|---|---|---|---|
| 8,510,304 B1 * | 8/2013 | Briggs | G06F 16/22 707/736 |
| 8,856,089 B1 * | 10/2014 | Briggs | G06F 16/2315 707/695 |
| 10,936,559 B1 * | 3/2021 | Jones | G06F 16/248 |
| 10,976,949 B1 * | 4/2021 | Calhoun, Jr. | G06F 3/064 |
| 2015/0370767 A1 * | 12/2015 | Sevilmis | G06F 16/93 715/255 |
| 2015/0370825 A1 * | 12/2015 | Outcalt | G06F 16/27 707/608 |
| 2018/0068304 A1 * | 3/2018 | Parker | G06Q 20/401 |
| 2018/0278705 A1 * | 9/2018 | Wagenknecht | H04L 67/141 |
| 2019/0317776 A1 * | 10/2019 | Walsh | G06N 20/00 |
| 2019/0332698 A1 * | 10/2019 | Cho | G06F 16/2365 |
| 2019/0391881 A1 * | 12/2019 | Horowitz | G06F 11/1451 |
| 2019/0392006 A1 * | 12/2019 | Horowitz | G06F 16/178 |
| 2020/0019532 A1 * | 1/2020 | Kashi Visvanathan | G06F 16/128 |
| 2020/0097567 A1 * | 3/2020 | Jaswal | G06F 3/0658 |
| 2021/0042292 A1 * | 2/2021 | Gentric | G06F 16/2358 |

* cited by examiner

Primary Examiner — Shean Tokuta
(74) Attorney, Agent, or Firm — DLA Piper LLP (US)

(57) ABSTRACT

A computer-implemented system and method for achieving strong consistency in an eventually consistent distributed system. The system comprises a database and an application server hosting a computer software product that a user subscribes to in order to access the product via a user device over a network. The application server receives a first service request from the user device for obtaining a first set of features associated with the user. The application server may ensure that the user receives a useable and correct set of features.

20 Claims, 7 Drawing Sheets

ACHIEVING STRONG CONSISTENCY IN AN EVENTUALLY CONSISTENT DISTRIBUTED SYSTEM

FIELD OF THE DISCLOSURE

The present disclosure relates to achieving strong consistency in an eventually consistent distributed system.

BACKGROUND

In modern distributed systems, processing a user request may be implemented by coordination of different systems and each participating system (e.g., a microservice) needs to successfully perform and complete its respective tasks in response to the user request. Because performance, availability and resilience are very important for a distributed system, a plurality of the processes may be performed asynchronously by different participating systems. For example, when a user subscribes to and signs onto an online computer software service or software product of a distributed system, the typical user signup process requires multiple systems and processes to run asynchronously, communicate with each other and coordinate their actions to set up and present data associated with the user and or its account. For example, an online software service or product may utilize a "User" system to provision a user, a "Payroll" system to provision a "Payroll" account, a "Subscription" system to create user access rights, an "Accounting" system to create a collection of accounts or customization results, and so on. Therefore, multiple participating systems are required to process different components or instances asynchronously without failure to complete the user signup process.

A problem may arise when one of the required participating systems fails to provide required information for processing the request. For example, when an individual system fails to process the request, or has yet to completely process the request, the user may not receive the correct data or a corresponding account customization before using the service or product. This integration architecture is commonly called an "Eventual Consistency" pattern. One processing failure may lead to a very prolonged "Eventual Consistency" such that a user may not see the correct result or data to sign onto the online software service or product immediately. Typically, existing recovery measures may be built around each system to recover from respective failures, which may be done by an automated offline mechanism via offline scheduler-based retries, recovery bot (i.e., software robot), manual human actions, and so on. However, none of these solutions are provided in real-time. Without real-time solutions to the described problem, there may be a significant period of a time in which the user may not see the correct or expected data while signing onto the online software service of product. Thus, system consistency cannot be achieved, resulting in a disappointing user experience. As such, there is a need to provide real time solutions for handling failures to avoid consistency issues to achieve an eventually consistent distributed system.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

DETAILED DESCRIPTION

Embodiments of the present provide techniques for achieving strong consistency in an eventually consistent distributed system.

The disclosed principles provide a practical technological solution to a problem associated with an online service or product to, among other things, process a user request to sign onto the online service or product while generating data for the user using a real-time resiliency/recovery mechanism for failure handling, thereby achieving an eventually consistent distributed system. Embodiments of the present disclosure may generate and send service instances to a service database to fetch data associated with the user and or its account identifier, and utilize real-time Application Programming Interface (API) requests for retrieving user entered data stored in a cache service and or a messaging system to retrieve the required data from user entered data associated with the user and or its account identifier stored throughout the distributed system. The use of one of these real-time procedures can guarantee that the required data is retrieved without errors.

Embodiments of the present disclosure provide a new architecture with an efficient approach for users to sign onto the online service or product faster by decomposing the processes as operations to be conducted with a strong consistency in the distribution system. The distribution system may consistently process user requests to guarantee the users to sign onto the online service product in a faster speed while presenting the users with correct data associated with respective user identifiers such that the users can view and manage their online account effectively.

The below description is made with reference to a user signing up for an online accounting service and being provided with a collection of accounts associated with the user. It should be understood, however, that the disclosed principles apply to any situation in which a user is signing up to use a software service/product in which a distributed system is used to set up data for the user.

Figure 1:
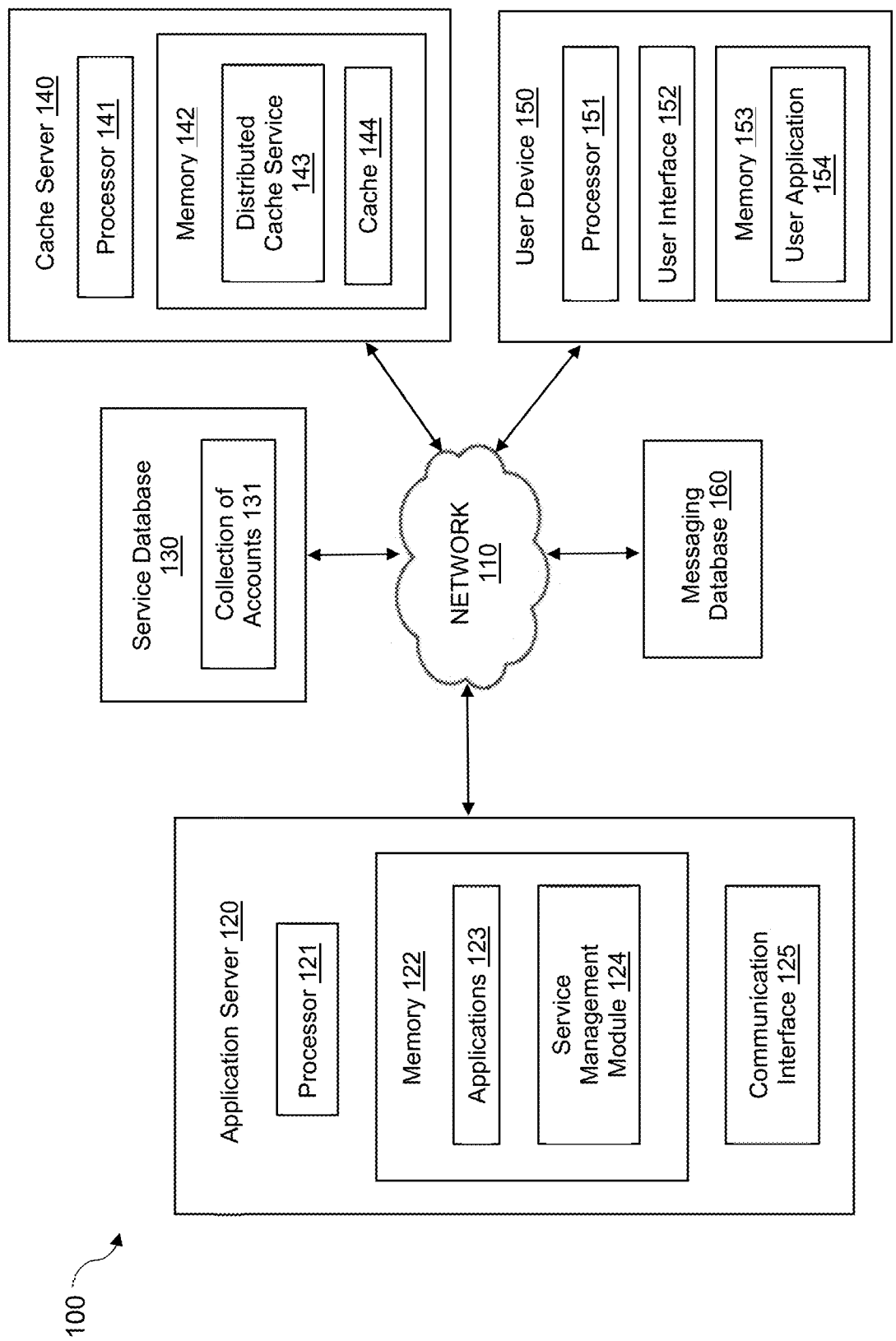
FIG. 1 illustrates an example computing system according to some embodiments of the present disclosure.

FIG. 1 illustrates an example computing system 100 implemented in a cloud hosting platform according to some embodiments of the present disclosure. As shown, the example computing system 100 may include an application server 120, a service database 130, cache server 140, one or more user devices 150 (e.g., user computing devices), a messaging database 160 of a messaging system, and one or more networks 110. The computing system 100 may utilize the cloud computing platform to deploy computer-implemented components such as microservices to users or clients in response to the users' requests. Networks 110 may include the Internet and/or other public or private networks or combinations thereof.

Application server 120 is operated in response to user service inquiries for delivering computer-implemented components throughout the system 100. Application server 120 may include one or more processors 121, which may be configured to collect and process the data, a memory 122 and a communication interface 125 for enabling communication over networks 110. Application server 120 may host one or more online software services or software products which are indicative of one or more applications 123 and a service management module 124 stored in memory 122. Applications 123 may be executed by the one or more processors 121 for providing configured application functions, services or hosting a website with particular services for users to visit and obtain information. Applications 123 may include a web application that can be accessed by a user device 150 via a user application 154 (e.g., a browser application or a mobile application) to process user requests or inquiries. The service management module 124 includes computer-executable instructions executed on one or more computing devices, in which the computing systems, model components, processes, and embodiments can be implemented as described below. The service management module 124 may be configured to generate service instances in response to users' inquiries for software components and application processes. Service instances may include but are not limited to microservices (such as those used with Amazon® Web Services (AWS)) in various embodiments described herein. The service instances may be program components or a program application configured with computer executable instructions which, when executed by a process, may perform computing functions.

Application server 120 and user devices 150 are each depicted as single devices for ease of illustration, but those of ordinary skill in the art will appreciate that application server 120, and/or user devices 150 may be embodied in different forms for different implementations. For example, application server 120 may include a plurality of servers in communication with each other through networks 110 located in different geographical areas. Alternatively, the operations performed by application server 120 may be performed on a single server.

Application server 120 may in communication with the cache server 140, service database 130, user devices 150, and messaging database 160 of the messaging system via the networks 110 in the cloud computing environment. In various embodiments described below, a user may subscribe to a financial software product hosted on the application server 120.

In response to a user's request to access a financial software service or product associated with the system 100, the application server 120 may execute the service management module 124 to generate service instances with software components and application processes for generating data of a collection of accounts 131 such as e.g., the Chart of Accounts (CoA) used in the many variants of an online software service or product associated with one or more of the user's financial accounts and presenting data of the collection of accounts 131 to a user computing device 150.

Service database 130 may be included in the application server 120, or coupled to or in communication with the application server 120 via the networks 110. Service database 130 may be a shared remote database, cloud database, or an on-site central database. Service database 130 may receive instructions or data from, and send data to, application server 120. Service database 130 may store user profiles of each user account. Service database 130 may store data associated with a plurality of collections of accounts for a plurality of users.

Communication between various network and computing devices of the computing system 100 may be facilitated by one or more application programming interfaces (APIs). The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. In some embodiments, application server 120 may receive a service request from a user device 150 remotely via a user application 154. The request may be generated using a variety of Application Programming Interfaces (API) query languages.

Cache server 140 may be a backend server operating in a cloud hosting environment. Cache server 140 may include one or more processors 141, which may be configured to collect and process the data, a memory 142, and a communication interface for enabling communication with service database 130 and messaging database 160 over networks 110. The cache server 140 may provide distributed cache service 143 which may be configured to communicate with an event management system or a messaging system and store user input data allowing users to interact with the messaging system. User input data may be stored in cache 144 of the cache server 140. The distributed cache service 143 may include computer-executable instructions executed on one or more computing devices, in which the computing systems, model components, processes, and embodiments can be implemented as described below. The distributed cache service 143 may be configured to generate service instances in response to users' inquiries for software components and application processes. Application server 120 is in communication with a cache server 140 to retrieve the user data for generating data of collection of accounts 131 associated with respective user accounts via networks 110.

In some embodiments, the distributed cache service 143 is executed to aggregate, receive and store user input data in the cache server 140. The user data may be partitioned and saved in partitions associated with the user account identifier (ID) in the cache server 140. The distributed cache service 143 may be accessed and read by the application server 120 to retrieve information for generating and updating data of collection of accounts associated with a user account ID in response to user login requests.

One or more of the user devices 150 may communicate with application server 120. Each user device 150 may be any device configured to present user interfaces and receive user inputs thereto. A user device 150 may include a processor 151, a user interface 152, memory 153, and a user application 154. For example, a user device 150 may be a smartphone, personal computer, tablet, laptop computer, mobile device, or other device. A user application 154 may be a mobile application installed on a mobile user device or a browser application that the user device may access the online software product hosted on the application server 120. The user application 154 may facilitate user interaction with application server 120 by presenting user interfaces and receiving inputs from a user. The user application 154 may be configured to transmit information to and receive information from application server 120 via the networks 110. Each user may register a user account with user information to subscribe to and access a particular product or service provided by application server 120 through the user application 154 at the user device 150 via network 110. Each user account may have a user profile and other user information that may be stored in service database 130. Each user profile may include user name, user account identifier (ID), user accounts associated with one or more subscribed products or services, email address, phone number, payment transaction accounts, and any other user information. The user may record opening balances associated with the user's accounts in a user profile. The user may sign onto the online product hosted on the application server 120 via a user application with user account name, user account password.

Figure 2:
FIG. 2 illustrates an example collection of accounts presented on a graphical user interface in accordance with some embodiments.

FIG. 2 illustrates an example representation of data features of a collection of accounts presented on a graphical user interface (GUI) 200 in accordance with some embodiments. In the illustrated example, a plurality of data features represent data of the collection of accounts and is visually presented to a user while the user signs onto the online service product that the user subscribes. For example, QuickBooks® Online provides and presents a plurality of features of a "Chart of Accounts" after users log onto the online service product, and allows its users to identify various financial accounts associated with their business to help organize their transactions so that the users know how much money they have and or owe in each account. As illustrated in FIG. 2, the plurality of example features may provide a list of financial categories including all user transactions categorized into a particular category. The data may include a plurality of data features stored in service database 130. In some embodiments, the plurality of features may be associated with a unique user account identifier and include a plurality of categories of features or attributes, such as an account name 202, account type 204, account description 206 (shown as "Detail Type" in the illustrated example), and account balance 208 to show the user's financial account information. In one or more embodiments, the data features or attributes associated with each unique user account identifier may include a country, particular regions in the country such as state, city, etc. Each of the plurality of the features may be represented by a number, natural language words, texts, phrases, sentences, etc.

The plurality of the features may be organized to provide a user with a view of the user's assets, liabilities, and equity expenses. The software product may present the features to organize user transactions on user reports and tax forms. Most accounting services allow users to identify their business' accounts in a listing or collection of accounts to help them balance their books and or prepare tax forms. The user assets may include vehicles, equipment, buildings, and other assets used for business. User liabilities may include the amounts a user owes but have not yet paid. User expenses may show the money that a user spends on expenses related to normal business operations such as advertising and promotion, office supplies, and rent. The plurality of the features may include user transaction behaviors associated with the registered user account. A financial service may automatically generate the plurality of the features based on the industry and type of company that a user chooses when creating a user file or a company file by registering a user account with an online service product.

Figure 3:
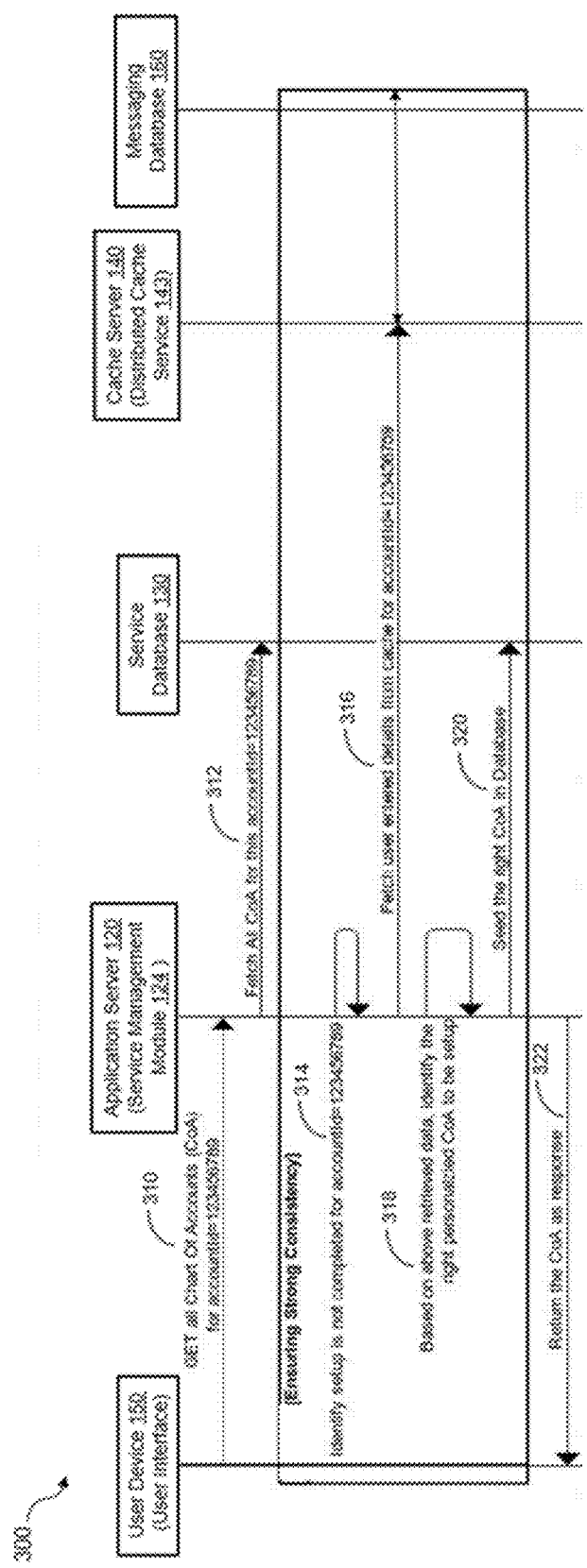
FIG. 3 illustrates an example distributed system and a data processing flow for achieving strong consistency in the distributed system according to some embodiments of the present disclosure.

FIG. 3 illustrates an example distributed system 300 and a data processing flow for achieving strong consistency in the system according to some embodiments of the present disclosure. In the illustrated example, the system 300 may be integrated into a financial management platform (e.g., Intuit QuickBooks® Counterpart Portal) for completing a user sign-in process and presenting a user collection of accounts in response to a user request. In some embodiments, system 300 may include a user device 150, application server 120, service database 130, cache server 140, and a messaging database 160. For example, application server 120 may execute the service management module 124 of FIG. 1 to process a user request to sign onto an online software service product successfully and in a faster manner while also generating correct features.

At 310, the user device 150 may be utilized to send a first application programming interface (API) request to application server 120 for a user to log onto the online software service product hosted by application server 120 to obtain a first set of features for a collection of accounts associated with a user account identifier (ID).

At 312, in response to the first API request, application server 120 may execute the service management module 124 to generate and send a microservice instance to service database 130 to fetch or retrieve data for setting up and presenting a first collection of accounts associated with the user account ID from service database 130.

At 314, based on the fetched data from the service database 130, application server 120 determines that the first set of the features for the first collection of accounts associated with the user account ID is not complete and not capable of being set up. Based on the retrieved data from service database 130, application server 120 determines one or more missing features required to set up and present the first collection of accounts for the user.

At 316, application server 120 may send a second API request, this time to cache server 140, to fetch or retrieve user entered data associated with the user account ID from the cache server 140 in order to obtain the at least one missing feature of the first set of the features for the collection of accounts. The distributed cache service 143 may communicate with a plurality of applications and software services 616 of a messaging system shown in FIG. 6 (described below) and store user input data while users interact with the plurality of the applications and software services 616. When the cache server 140 determines that the cache does not store the one or more missing features required to set up and present the collection of accounts associated with the user account ID, the service management module 124 may be executed by the processor 121 to access a correct offset of a partition associated with the user account ID in the messaging system database 160 to obtain the one or more missing features required to set up the collection of accounts.

At 318, based on the retrieved data from the service database 130, retrieved user entered data from cache 144 of cache server 140, and or data from a messaging system database 160 associated with the user account ID, application server 120 may execute the service management module 124 to identify the one or more missing features to generate a second set of features for setting up a correct personalized collection of accounts as a second collection of accounts.

At 320, application server 120 may execute the service management module 124 to seed data of the set of the features for the second collection of accounts to the service database 130 and update the data of the first collection of accounts associated with the user account ID in service database 130.

At 322, application server 120 may execute the service management module 124 to send the second set of the features for the correct customized collection of accounts (e.g., the second collection of accounts) to the user application 154 and present the second collection of accounts on the user interface of the user device 150. An incomplete set of features may occur in many ways and may lead to a prolonged time for the user to sign onto the online software service product. For example, a database interaction failure (314 in FIG. 3) and network latency in the distributed system 300 may lead to an incomplete set of features for the collection of accounts for the user account ID. In another example, part of the distribution system 300 may be implemented as an event-based architecture (e.g., messaging platform 600). In these instances, the incomplete set of features for the collection of accounts may occur when the distribution system 300 is required to react to service requests before related user messages with user inputs are processed or a failure of processing the user message(s) occurs.

Different example processes described below may be decomposed into multiple operations to be conducted consistently by different components of the example distributed system 300 to process the user request such that the user may sign onto the online software service product successfully and at a faster speed. A complete set of features associated with the user account ID may be generated and presented to the user.

Figure 4:
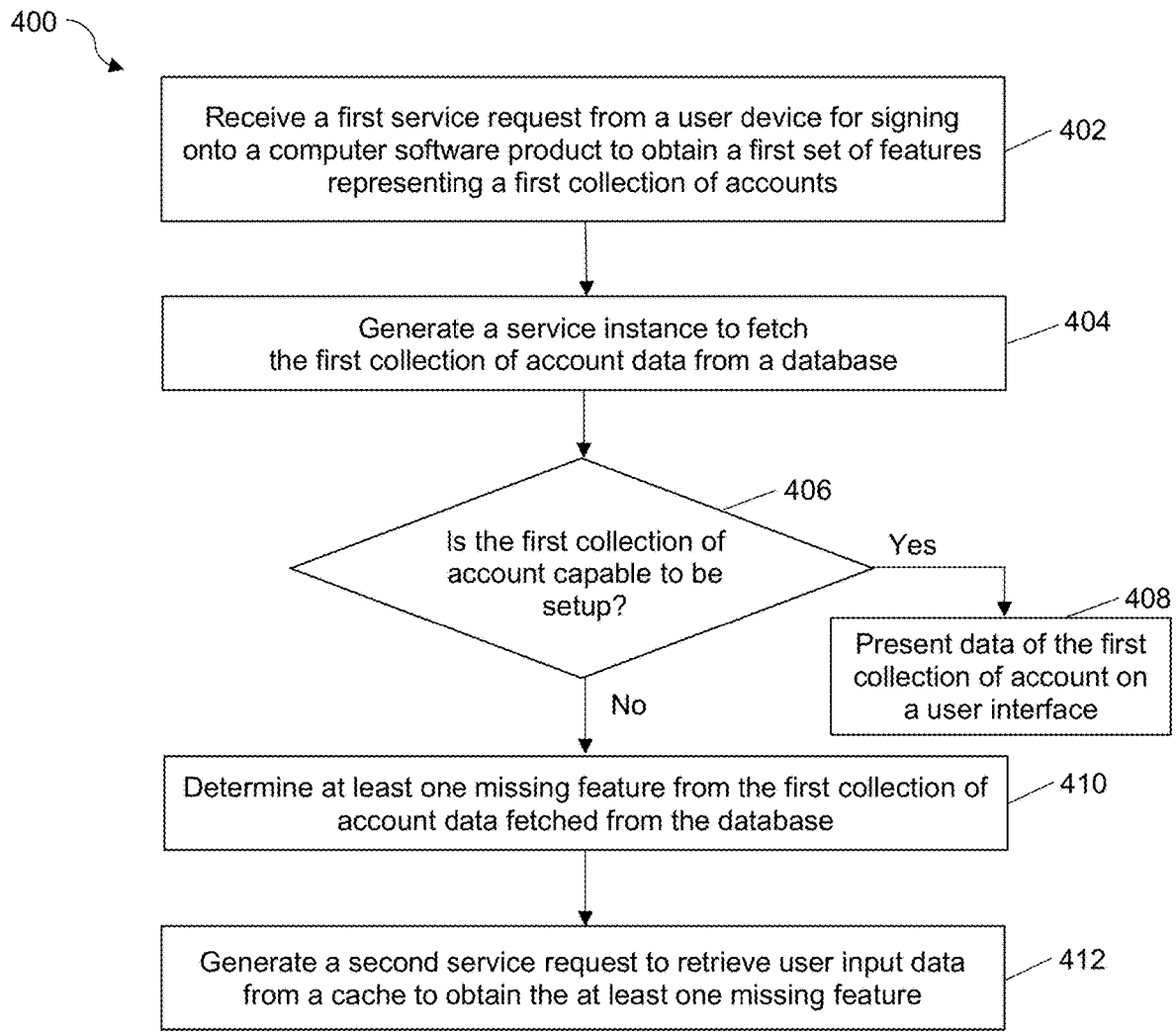
FIG. 4 is a flowchart illustrating an example process for a user to sign onto an online software service or product and achieving strong consistency in a distributed system according to some embodiments.

FIG. 4 is a flowchart illustrating an example process 400 for a user to sign onto an online software service or product and achieving strong consistency in a distributed system according to some embodiments. The process 400 may be configured as computer programs (e.g., software) executed on one or more computers including a remote application server 120, cache server 140 and user device 150, in which the systems, application programming interface (API) requests, service instances, processes, and embodiments described below can be implemented.

At step 402, a user may sign onto an account of an online service software product (e.g., the QuickBooks® online application) hosted on application server 120 via a user application 154 executed on a user device 150 over the network 110. The user may access a user account to view the associated collection of accounts information. The user request may be implemented as a first application programming interface (API) request, which is initiated by the user device 150 and transmitted to the application server 120 via a network 110 or communication channel. The first service request may include user account data for the service management module 124 to identify a user account ID (e.g., 123456789 illustrated in FIG. 3) and obtain all collection of accounts data for the user account ID (310 in FIG. 3).

At step 404, in response to the user request to sign up for the online software service or product and thus obtain a first set of features for the collection of accounts associated with the user account ID, the service management module 124 of the application server 120 may be executed by the processor 121 to generate and send a microservice instance to service database 130 to fetch data of a first collection of accounts associated with the user account ID (312 in FIG. 3).

At step 406, the service management module 124 may be executed by the processor 121 to determine whether the first collection of accounts can be set up based on the fetched collection of accounts data from service database 130.

At step 408, if the first collection of accounts associated with the user account ID can be set up based on the fetched collection of accounts data from service database 130 (i.e., a "yes" at step 406), the service management module 124 may send the response back to the user application 154 to present the collection of accounts associated with the user account ID to the user interface of the user device 150.

At step 410, in response to determining that setting up the first collection of accounts for the user account ID cannot be completed (314 in FIG. 3) based on the fetched collection of accounts data from service database 130 (i.e., a "no" at step 406), the service management module 124 may identify and determine at least one missing feature based on the fetched collection of accounts data from the service database 130.

At step 412, the service management module 124 may be executed by the processor 121 to automatically generate and transmit a second API request as a second service request to the cache server hosting the distributed cache service (e.g., 143 in FIG. 1) to retrieve user input data associated with the user account ID from the cache server 140 (316 in FIG. 3). For example, the second API request may be generated in the form of an Hypertext Transfer Protocol (HTTP) call and sent to the cache server to fetch the collection of accounts information associated with the account identifier. The cache server 140 may store user input data in respective cache partitions which are associated with a plurality of registered user accounts and respective user account identifiers. The user input data may include a plurality of data features or attributes associated with each unique user account identifier. In response to the second API request, the distributed cache service 143 may identify and determine whether the at least one missing feature of the first set of features for the first collection of accounts can be obtained based on the user input data stored in partitions of the cache associated with the user account ID.

Figure 5:
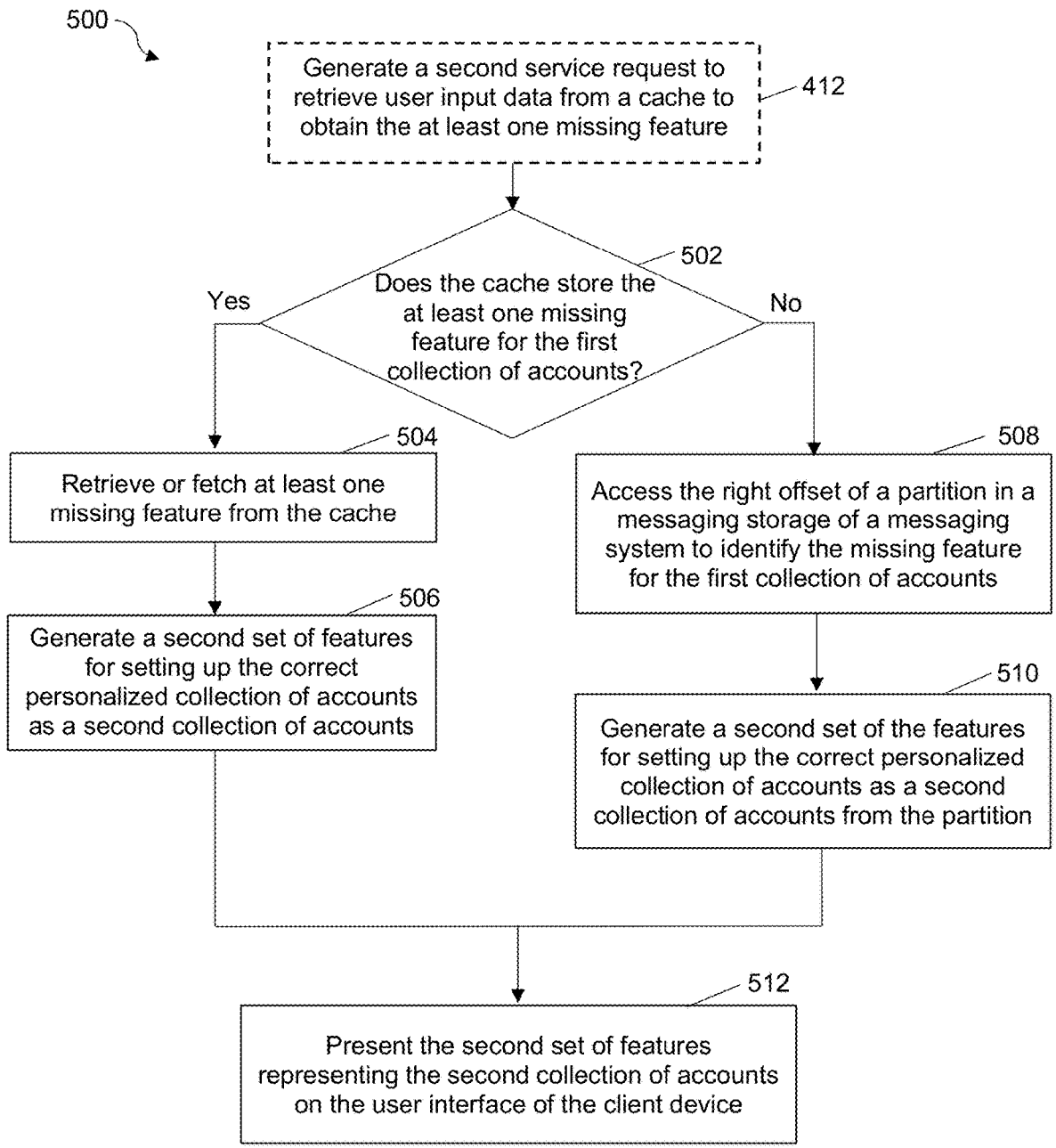
FIG. 5 is a flowchart illustrating an example process for a user to sign onto an online software service or product for setting up a collection of accounts associated with a user account identifier to eventually achieve strong consistency in a distributed system according to some embodiments.

FIG. 5 is a flowchart illustrating an example process 500 to obtain the missing feature for a user to sign up for the online software service or product, generating a complete set of features for setting up, and presenting the collection of accounts associated with a user account identifier while eventually achieving strong consistency in a distributed system according to some embodiments. The process 500 may be configured as computer programs (e.g., software) executed on one or more computers including an application server 120, a cache server 140 and user device 150, in which the systems, application programming interface (API) requests, service instances, processes, and embodiments described below can be implemented.

At step 502, the distributed cache service 143 may be executed by the cache server 140 to determine whether the cache server 140 stores the at least one missing feature of the first collection of accounts associated with the user account ID. Based on such a determination, the embodiments of the present disclosure provide two different methods to obtain the missing feature for setting up and presenting the first collection of accounts.

At step 504, the first method is applied when the cache server 140 determines that the cache stores at least one of the missing features of the first collection of accounts (i.e., a "yes" at step 502). By utilizing the first method, the service management module 124 may be executed by the processor 121 to retrieve or fetch at least one missing feature associated with the user account ID from the cache of the cache server 140. The distributed cache service 143 may be executed to retrieve or fetch the at least one missing feature from the cache 144 of the cache server 140 based on certain features or attributes such as a country of the account identifier and or a type of the account identifier associated with the user input data.

At step 506, based on the retrieved missing feature, the service management module 124 may be executed by the processor 121 to identify and generate a second set of features for setting up the correct personalized collection of accounts as a second collection of accounts (318 in FIG. 3), and seed data of the second set of the features for the second collection of accounts to update the first set of the features for the first collection of accounts associated with the user account identifier in the service database 130 (320 in FIG. 3).

At step 508, the second method is applied when the cache server 140 determines that the cache does not store the at least one missing feature of the first set of features for the first collection of accounts associated with the user account ID (i.e., a "no" at step 502). By utilizing the second method, the service management module 124 may be executed by the processor 121 to access a correct offset of a partition associated with the user account ID in a storage of a messaging system (e.g., a messaging database 160) to identify the missing feature of the first collection of accounts. The messaging database 160 may include user input data associated with the use account ID which a user has used to communicate with a plurality of applications or software services. The user input data comprises at least one of the missing features required for the user to interact with one or more of a plurality of online services via the messaging system. Each user account ID may be mapped to respective partition in the message databased 160 of the messaging system. The messaging system storage stores the user input data in a tracked position (e.g., offset) of the partition associated with the user account identifier. At least one missing feature of the first collection of accounts may be fetched or retrieved by the processor 121 from the partition associated with the user account ID. Details about a messaging system will be described in FIG. 6 below.

At step 510, based on the retrieved missing feature from the partition of the messaging database 160 and retrieved data from service database 130, the service management module 124 may be executed by the processor 121 to identify and generate a second set of the features for setting up the correct personalized collection of accounts as a second collection of accounts (318 in FIG. 3), and seed data of the second set of the features to update the first set of the features associated with the user account ID in the service database 130 (320 in FIG. 3). For example, the second set of the features may represent data associated with a plurality of user financial accounts managed by the computer software product. The service management module 124 may be executed by the processor 121 to update the data associated with the user account ID with the correct second collection of accounts in service database 130.

At step 512, the service management module 124 may be executed by the processor 121 to send data of the second set of the features representing the correct collection of accounts associated with the user account ID back to the user application 154 and present the second collection of accounts on the user interface of the user device 150 (322 in FIG. 3).

Figure 6:
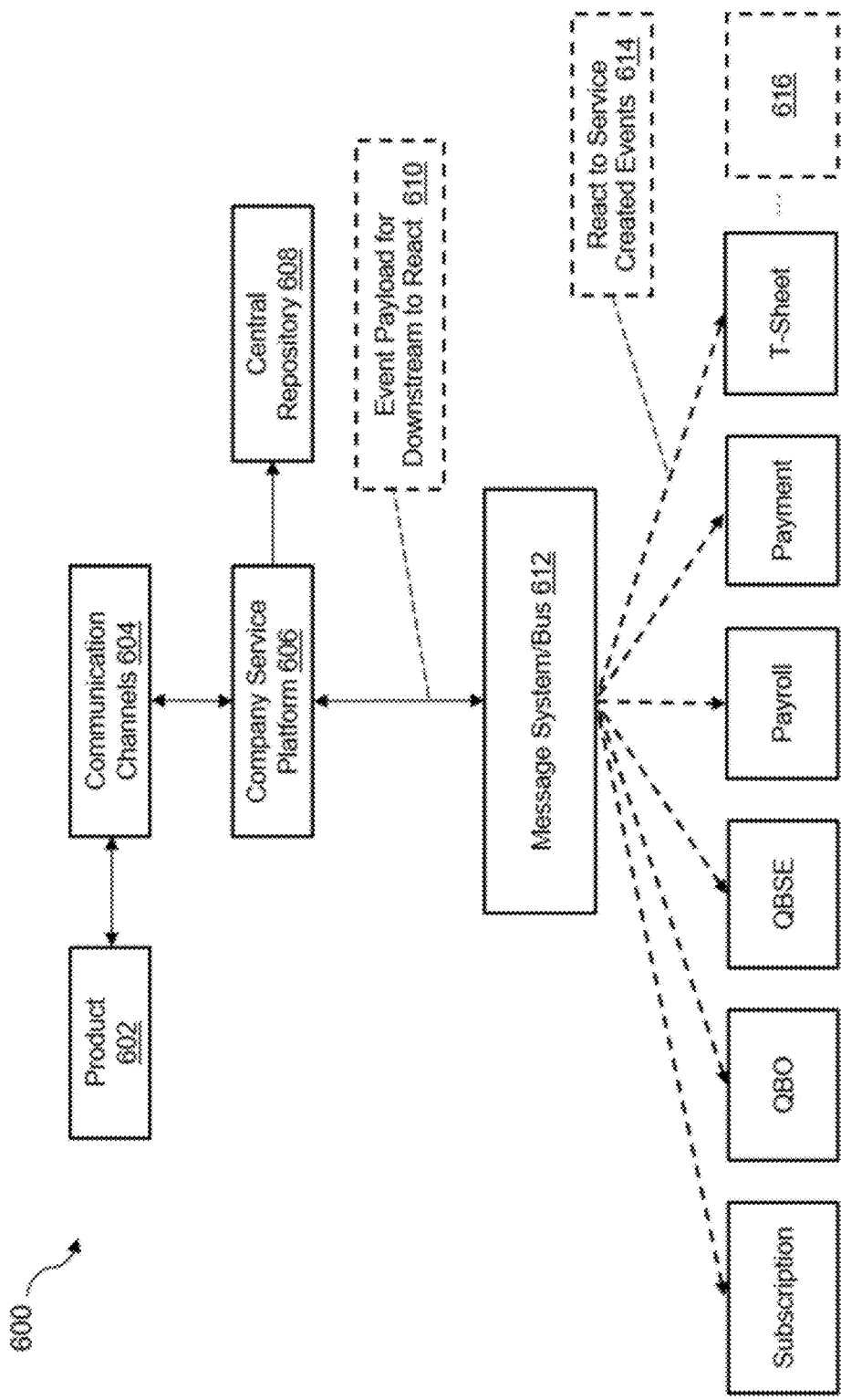
FIG. 6 illustrates a schematic diagram of an example messaging platform according to some embodiments of the present disclosure.

FIG. 6 illustrates a schematic diagram of an example messaging platform 600 according to some embodiments of the present disclosure. For example, a user may sign onto an online software service product 602 (e.g., QuickBooks® products or services) via a user device 150 through communication channels 604 over a company service platform 606 (e.g., an Intuit® Small Business Self-Employed Group (SBSEG) platform). In some embodiments, the company service platform 606 may interact with a distributed streaming platform implemented as an asynchronous event processing system or a messaging system 612 (e.g., a Kafka messaging system/Bus). The messaging platform 600 may include a central repository 608 to receive and store information of electronic events 614 generated by a plurality of systems or software services 616. The central repository 608 may include a messaging database (160) to store user messages with user input data that are associated with a user account ID and generated in response to the electronic events 614 created by the plurality of systems or software services 616. The user messages with the user input data associated with a user account ID may be broadcast to different systems or the plurality of different software services 616. Each system or software service 616 may be implemented by its respective application server.

The messaging system 612 may receive from the company service platform 606 event payload for downstream to react 610. The messaging system 612 may send messages between processes, applications, and servers. The messaging system 612 may publish and subscribe to streams of records, store streams of records in a fault-tolerant durable way, and process streams of records as they occur in real-time. The messaging system 612 may build real-time streaming data pipelines that reliably read and write data between a plurality of systems or applications 616, and react to electronic events 614 with the streaming data in real-time. The messaging system may effectively store streaming data with user input data in different partitions associated with respective user account IDs in the messaging database 160.

When an individual system such as an "accounting" system fails while processing the message or has yet to process the message, the user may not see the correct collection of accounts or all features of collection of accounts displayed in the service product when navigating inside the service product. A process may need to proceed to obtain the required correct features of the collection of accounts via the messaging platform 600.

The user collection of accounts may include information associated with a plurality of internal application services provided by the company service platform 606. A user may sign onto the messaging system with a user ID. The user may log into an application associated with one of service products from a provider via various communication channels. The communication channels 604 may be a wired connection, a wireless connection, or a combination of wired and wireless connections through which various software product or services may communicate with the messaging system. The messaging system may receive recorded events as downstream payload when a user interacts with various software product services, such as "Subscription" system, "QBP" system, "Payroll" system, "Payment" system, "T-sheet" system, etc. These systems may operate consistently via the messaging platform 600 where the user entered data stored into the messaging database 160 of the messaging system is guaranteed. The messaging system 612 may react to company created events and redirect the data to the software product 602.

In one or more embodiments, each online software product may verify a user subscription and connect to a billing system and use the billing system to confirm the subscription. The computer software product that a user subscribes to may call multiple participating systems or software services 616 to broadcast or push the message or user inputs to multiple participating systems or software services 616 and make sure that multiple participating systems or software services 616 operate consistently. In some embodiments, the distributed cache service 143 may collect and aggregate user input data from different software products and store them into the cache 144.

The messaging system 612 may record and organize the user events and activities into topics. The event information may be recorded and be placed on a specified message topic. A topic may be a category or a feed name to which user input data are stored and published. A topic may include multiple partition logs. The messaging system may interact with each of the applications for a software product service provider to publish a message or user input to a partition on a topic and for a user or subscriber to consume a message from a partition in a topic. The message or user input data may be stored in the partition log and be tracked based on the tracking the position (e.g., offset) in the partition log. Topics may be divided into a number of partitions, which may store the user input data in an unchangeable sequence. The user input data that are stored in a partition may be assigned and identified by its offset. Partitioning setup may be based on the user account ID to access a particular application. Different users may be associated with different user account. Each user account ID may be mapped to respective partition. For example, a user may login on to a web application associated with a software product. The web application may publish user input data to a partition in the topic. The user activities associated with the topic may be logged and recorded in the partition with the incremented message offsets.

In some embodiments, the group of service instances may be executed by the messaging system 612 to react to electronic events 614 created by a plurality of various software services. Each service instance is recorded with the messaging system 612 with its corresponding data including user input data and runtime status over a network 110. For each available service instance, the distributed cache service 143 is configured to execute an API process to obtain specific user features associated with the collection of accounts of a user account ID consistently. The distributed cache service 143 updates corresponding data including user input data and runtime status of each service instance over the messaging system in real-time and or periodically.

The embodiments described herein address the problems associated with computer centric issue of logging onto an online computer software service or product to obtain and retrieve data of the collection of accounts over a distributed process. In one or more embodiment, the solution may be provided from a cache and or from a storage of an asynchronous messaging system to set up in real-time a customized collection of accounts without the issues experienced by conventional systems.

The embodiments described herein provide the real time solution using API requests to achieve strong consistency in an eventually consistent distributed system. Embodiments of the present disclosure provide an eventually consistent distributed system with faster processing and delivery of application services in real-time to and satisfy customer expectations. The embodiments also improve the efficiency of the computing system on consistently processing a user request to sign onto an online product to obtain a set of required features for a collection of accounts to set up and present the customized collection of accounts associated with the user account identifier. Embodiments of the present disclosure provide a new architecture with a fast processing approach for a user to sign onto the online product by decomposing the processes as asynchronous operations to be conducted consistently as describe above. For example, the processing time for retrieving data of the collection of accounts and presenting the collection of accounts can be improved by 33% (e.g., decreased from and over 30 second process to less than 9 seconds).

Embodiments of the present disclosure establish a computer-implemented system and method to provide fast-recoverable and faster delivery of application services for generating and presenting correct user data of collection of accounts, and allowing a large group of users to quickly sign-in the online software service or product and access data of their collection of accounts associated with their user identifiers. The computer-implemented system and method may achieve an eventually consistent distributed system while generating and presenting data of the collection of accounts with faster processing speed and with an increased accuracy of data of the collection of accounts associated with a user identifier, thereby providing an improved and personalized user experience during a user signup process.

Figure 7:
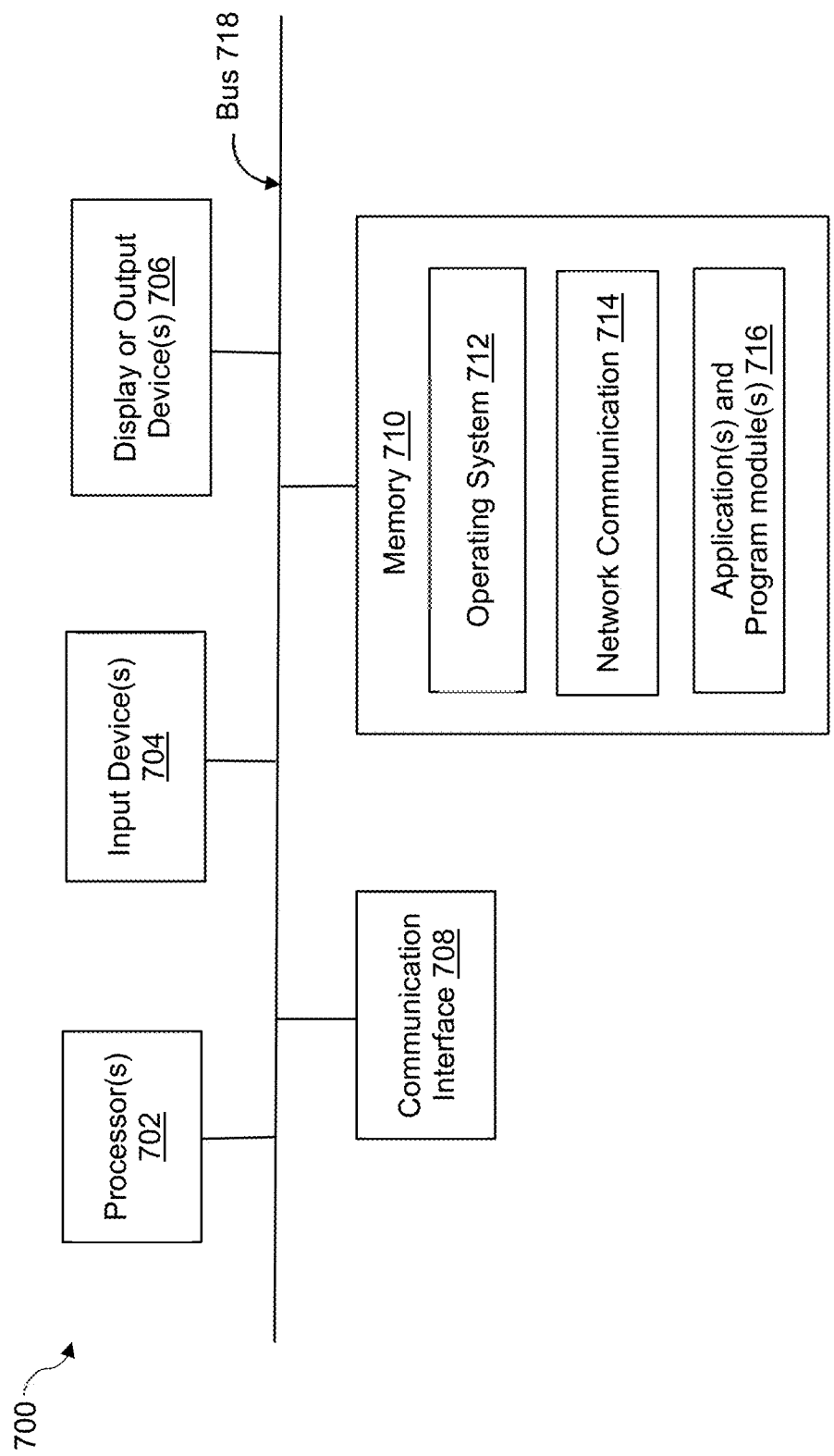
FIG. 7 is a block diagram of an example computing device according to some embodiments of the present disclosure.

FIG. 7 is a block diagram of an example computing device 700 that is utilized to execute embodiments to implement processes including various features and functional operations as described herein. For example, computing device 700 may function as application server 120, cache server 140, user device 150 or a portion or combination thereof. The computing device 700 may be implemented on any electronic device to execute software applications derived from program instructions for and as illustrated in FIGS. 3-5, and includes but not limited to personal computers, servers, smartphones, media players, electronic tablets, game consoles, email devices, etc. In some implementations, the computing device 700 may include one or more processors 702, one or more input devices 704, one or more display devices or output devices 706, one or more communication interfaces 708, and memory 710. Each of these components may be coupled by bus 718, or in the case of distributed computer systems, one or more of these components may be located remotely and accessed via a network.

Processor(s) 702 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 704 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 706 such as a CRT (cathode ray tube) or LCD (liquid crystal display) monitor for displaying information to the user and a keyboard and a pointing device such as a mouse or a trackball by which the user can provide input to the computer. Display device 706 may be any known display technology, including but not limited to display devices using Liquid Crystal Display (LCD) or Light Emitting Diode (LED) technology.

Communication interfaces 708 may be configured to enable computing device 700 to communicate with other another computing or network device across a network, such as via a wired connection, a wireless connection, or a combination of wired and wireless connections. For example, communication interfaces 708 may include an Ethernet interface, an optical interface, a coaxial interface, an infrared interface, a radio frequency (RF) interface, a universal serial bus (USB) interface, a Wi-Fi interface, a cellular network interface, or the like.

Memory 710 may be any computer-readable medium that participates in providing computer program instructions and data to processor(s) 702 for execution, including without limitation, non-transitory computer-readable storage media (e.g., optical disks, magnetic disks, flash drives, etc.), or volatile media (e.g., SDRAM, ROM, etc.). Memory 710 may include various instructions for implementing an operating system 712 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 704; sending output to display device 706; keeping track of files and directories on memory 710; controlling peripheral devices (e.g., disk drives, printers, etc.) which can be controlled directly or through an I/O controller; and managing traffic on bus 718. Bus 718 may be any known internal or external bus technology, including but not limited to ISA, EISA, PCI, PCI Express, USB, Serial ATA or FireWire.

Network communications instructions 714 may establish and maintain network connections (e.g., software applications for implementing communication protocols, such as TCP/IP, HTTP, Ethernet, telephony, etc.). Application(s) and program modules 716 may include software application(s) and different functional program modules which are executed by processor(s) 702 to implement the processes described herein and/or other processes. For example, the program modules 716 may include a service management module for retrieving features of a collection of accounts in response to user inquiries for accessing program components and application processes. The program modules 716 may include but not limited to software programs, machine learning models, objects, components, data structures that are configured to perform particular tasks or implement particular data types. The processes described herein may also be implemented in operating system 712.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user computing device and server may generally be remote from each other and may typically interact through a network. The relationship of user computing devices and application server may arise by virtue of computer programs running on the respective computers and having a client-server relationship to each other.

Communication between various network and computing devices 700 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by an application server, the application server comprising a processor and a memory, the application server hosting a computer software product that a user subscribes to in order to access the computer software product via a user computing device over a network, the memory storing executable instructions that when executed by the processor cause the application server to:
   receive from the user computing device a first service request for signing onto the computer software product to obtain a first set of features associated with a user account identifier;
   generate a service instance to fetch, from a database, data for the first set of features associated with the user account identifier;
   determine, based on the fetched data, that the first set of features are incomplete;
   identify at least one missing feature from the first set of the features fetched from the database;
   access a messaging system storage containing the user's previous interactions with the first set of features to identify an offset in a partition associated with the user account identifier and retrieve the at least one missing feature from the partition; and
   generate and present, on a graphical user interface of the user computing device, a second set of features based on the at least one missing feature and the first set of features.

2. The method of claim 1, wherein the executable instructions are further operable to cause the application server to transmit the second set of the features to the database to update the first set of features for associated with the user account identifier.

3. The method of claim 1, wherein the executable instructions are further operable to cause the application server to:
   generate a second service request to retrieve user input data stored in a cache and associated with the user account identifier to obtain the at least one missing feature; and
   retrieve the at least one missing feature from the cache in response to determining that the cache stores the at least one missing feature, wherein the cache is controlled by a distributed cache service executed by a cache server.

4. The method of claim 3, wherein retrieving the at least one missing feature of from the cache is based on the user input data associated with the account identifier.

5. The method of claim 3, wherein the service instance is deployed as a microservice between the application server and the cache server over the network.

6. The method of claim 3, wherein the first service request is a first application programming interface (API) request comprising the user account identifier, and the second service request is a second API request comprising at least the one missing feature identified from the first set of the features.

7. The method of claim 1, wherein the second set of the features represents data associated with a plurality of user financial accounts managed by the computer software product.

8. The method of claim 3, wherein the user input data is generated when the user interacts with the first set of features via the user computing device through the messaging system over the network.

9. The method of claim 8, wherein the computer software product that the user subscribes is configured to call the plurality of the online software services to broadcast the user inputs such that the plurality of the online software services operate consistently.

10. The method of claim 8, wherein the messaging system comprises the messaging system storage that stores the user input data corresponding to the partition associated with the user account identifier.

11. A computing system, comprising:
   a database comprises data associated with a plurality of collections of accounts for a plurality of users; and
   an application server, the application server comprising a processor and a memory, the application server hosting a computer software product that a user subscribes to access via a user computing device over a network, the memory storing computer-executable instructions which are executed by the processor to cause the application server to:
      receive, via a user interface of the user computing device, a first service request for signing onto the computer software product to obtain a first set of features for a collection of accounts associated with a user account identifier;
      generate, from a database, a service instance to fetch data of the first collection of accounts associated with the user account identifier;
      determine, based on the fetched data, that the first collection of accounts is not capable of being setup;
      identify at least one missing feature from the first collection of accounts fetched from the database;
      generate a second service request to retrieve user input data stored in a cache and associated with the user account identifier to obtain the at least one missing feature of the first collection of accounts;
      upon determining that the cache does not store the at least one missing feature of the first set of the features, access a messaging system storage containing the user's previous interactions with the first set of features to identify an offset in a partition associated with the user account identifier and retrieve the at least one missing feature from the partition; and
      generate and present, on a graphical user interface of the user computing device, a second collection of accounts based on the at least one missing feature and the first collection of accounts.

12. The computing system of claim 11, wherein the executable instructions are further operable to cause the application server to transmit the second set of the features for the second collection of accounts to the database to update the first set of the features for the first collection of accounts associated with the user account identifier.

13. The computing system of claim 11, wherein the executable instructions are further operable to cause the application server to:
   retrieve the at least one missing feature of the first collection of accounts from the cache in response to determining that the cache stores the at least one missing feature of the first collection of accounts, wherein the cache is controlled by a distributed cache service executed by a cache server.

14. The computing system of claim 13, wherein retrieving the at least one missing feature of the first collection of accounts from the cache is based on the user input data associated with the account identifier.

15. The computing system of claim 11, wherein the service instance is deployed as a microservice between the application server and a cache server over the network.

16. The computing system of claim 11, wherein the first service request is a first application programming interface (API) call comprising the user account identifier, and the second service request is a second API request comprising the at least one missing feature identified from the first collection of accounts and the user account identifier.

17. The computing system of claim 11, wherein the second set of the features represents data associated with a plurality of user financial accounts managed by the computer software product.

18. The computing system of claim 11, wherein the user input data is generated when the user interacts with the first set of features via the user computing device through the messaging system over the network.

19. The computing system of claim 18, wherein the computer software product that the user subscribes is configured to call the plurality of the online software services to broadcast the user inputs such that the plurality of the online software services operate consistently.

20. The computing system of claim 18, wherein the messaging system comprises the messaging system storage that stores the user input data corresponding to the partition associated with the user account identifier.

* * * * *